United States Patent
Liu et al.

(10) Patent No.: US 9,325,768 B2
(45) Date of Patent: Apr. 26, 2016

(54) SYSTEM AND METHOD FOR CLUSTERED TRANSACTIONAL INTEROPERABILITY OF MULTIPLE MESSAGING PROVIDERS USING A SINGLE CONNECTOR MECHANISM

(71) Applicant: Oracle International Corporation, Redwood Shores, CA (US)

(72) Inventors: Qiang Liu, Portland, OR (US); Dongbo Xiao, Edison, NJ (US); Lily He, Beijing (CN); Paul Parkinson, Mount Laurel, NJ (US); Thomas E. Barnes, Whitehouse Station, NJ (US); Jefferey Steidl, Portland, OR (US); Vivekananda Maganty, Portland, OR (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 215 days.

(21) Appl. No.: 13/872,976

(22) Filed: Apr. 29, 2013

(65) Prior Publication Data
US 2013/0290524 A1    Oct. 31, 2013

Related U.S. Application Data

(60) Provisional application No. 61/793,043, filed on Mar. 15, 2013, provisional application No. 61/793,257, filed on Mar. 15, 2013, provisional application No. 61/793,459, filed on Mar. 15, 2013, provisional application No. 61/800,016, filed on Mar. 15, 2013, provisional application No. 61/799,391, filed on Mar. 15, 2013, provisional application No. 61/639,786, filed on Apr. 27, 2012, provisional application No. 61/639,791, filed on Apr. 27, 2012.

(51) Int. Cl.
*G06F 15/173* (2006.01)
*H04L 29/08* (2006.01)
*H04L 12/58* (2006.01)
*G06F 9/44* (2006.01)
*G06F 9/54* (2006.01)

(52) U.S. Cl.
CPC ........ *H04L 67/00* (2013.01); *G06F 8/30* (2013.01); *G06F 9/541* (2013.01); *G06F 9/546* (2013.01); *H04L 51/06* (2013.01); *H04L 67/1002* (2013.01); *G06F 2209/547* (2013.01)

(58) Field of Classification Search
USPC .......... 709/203, 206, 207, 218, 219, 223, 224
See application file for complete search history.

(56) References Cited

U.S. PATENT DOCUMENTS

| | | | |
|---|---|---|---|
| 2005/0044197 A1* | 2/2005 | Lai ................................ | 709/223 |
| 2009/0265704 A1* | 10/2009 | Branda et al. ................. | 717/176 |
| 2010/0115059 A1* | 5/2010 | Youill et al. .................. | 709/219 |
| 2012/0331135 A1* | 12/2012 | Alon et al. ..................... | 709/224 |

\* cited by examiner

*Primary Examiner* — Vivek Srivastava
*Assistant Examiner* — Karina J Garcia-Ching
(74) *Attorney, Agent, or Firm* — Marger Johnson

(57) ABSTRACT

A system has at least one requesting application residing upon a requesting application server, a cluster of processing message servers, a resource adapter in the form of executable code being executed by a processor on a first computer, the resource adapter to receive a request from the requesting application; transmit the request to the cluster of processing message servers; monitor processing of the request on the cluster of processing message servers; handling any exception in the processing of the request; and responding to the requesting application when the processing is complete. The system also includes an interposed transaction manager in the form of executable code being executed by a processor, the interposed transaction manager to receive transactional operations associated with the requests, and providing transaction guarantees related to the transactional operations.

15 Claims, 3 Drawing Sheets

SYSTEM AND METHOD FOR CLUSTERED TRANSACTIONAL INTEROPERABILITY OF MULTIPLE MESSAGING PROVIDERS USING A SINGLE CONNECTOR MECHANISM

RELATED APPLICATIONS

This application claims benefit of provisional patent applications 61/639,786, and 61/639,791, both filed Apr. 27, 2012; and provisional patent applications 61/793,043, 61/793,257, 61/793,459, 61/800,016, and 61/799,391, all filed Mar. 15, 2013, all incorporated by reference herein in their entirety.

This application is related to the following co-pending US Patent Application Nos., all filed Apr. 29, 2013, all incorporated by reference herein in their entirety:

Ser. No. 13/872,899, "SYSTEM AND METHOD FOR CLUSTERED TRANSACTIONAL INTEROPERABILITY OF PROPRIETARY NON-STANDARD FEATURES OF A MESSAGING PROVIDER USING A CONNECTOR MECHANISM;"

Ser. No. 13/872,919, "METHOD FOR A CONNECTOR PROVIDING TRANSACTIONAL INTEROPERABILITY TO MULTIPLE MESSAGING PROVIDERS TO MULTIPLE APPLICATION SERVERS USING THE SAME IMPLEMENTATION;"

Ser. No. 13/872,797, "SYSTEM AND METHOD FOR A CONNECTOR BEING ABLE TO ADAPT TO NEWER FEATURES INTRODUCED TO A MESSAGING PROVIDER WITH ONLY CONFIGURATION CHANGES;" and Ser. No. 13/872,822, "DYNAMIC CODE GENERATION TO DYNAMICALLY CREATE AND DEPLOY MESSAGING PROVIDER-SPECIFIC WRAPPERS FOR A RESOURCE ADAPTER."

BACKGROUND

In enterprise information systems (EIS), application servers often connect to the EIS through a 'connector.' The most prevalently used connector and standards are based on JAVA™ and the connector architecture is JAVA™ Connector Architecture (JCA). Prior to the implementation of JCA, it was extremely difficult for application servers to integrate into an EIS because they had to be customized each way. The advent of JCA solved some of these problems, but created others, so integration remains difficult even with JCA.

The implementation of JCA allows JCA-enabled application servers to integrate with any JCA-compliant EIS. Beyond the standard architecture, users could still add additional functionality and/or optimizations. Users can write more specific JCA-based connectors and allow this customization to function.

One area in which the JCA has not solved problems is with regard to transaction managers. Transaction managers are parts of an application that coordinate transactions across resources. Transaction managers focus on the execution of a particular transaction across different resources. For example, if a user places an order to an online retailer, the transaction may include interactions with a catalog, order processing, inventory, shipping, etc. The transaction manager tracks all of these interactions until the transaction is complete.

These interactions involve messages between computers, typically transmitted and received between multiple application servers that may be of many different types, such as Oracle WebLogic, Oracle Glassfish, Redhat JBoss, IBM Websphere, etc. The current JCA-enabled connectors do not interact well with the transaction managers with regard to messaging without extensive customization. Further, the transaction managers do not handle clustering of resources well in the messaging contexts. Clustering allows for distributed processing of the messages across multiple message servers and application servers. However, application servers typically do not have the capability to recognize foreign clusters to manage the message lifecycle and provide guarantees as to the processing of the requests in the messages. For example, IBM Websphere, IBM's application server offering, is able to deal with Websphere MQ through proprietary means since they are implemented by the same company and know the internals and are able to make agreements within the company to get things to work together. However, IBM Websphere does not know how to deal with clustered Oracle WebLogic JMS or clustered Tibco EMS JMS, which IBM does not implement and does not know the internal workings of these other products.

DETAILED DESCRIPTION OF THE EMBODIMENTS

Figure 1:
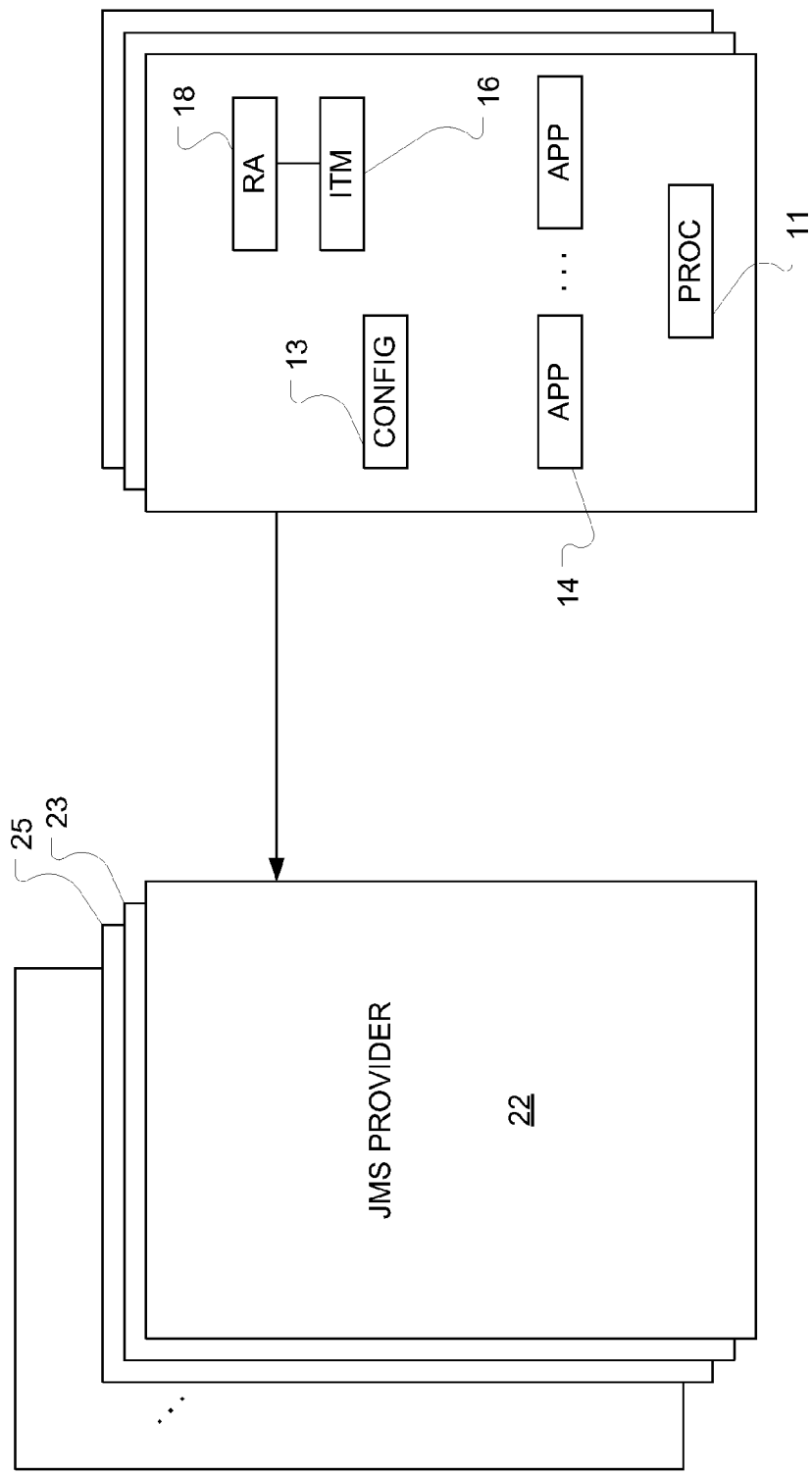
FIG. 1 shows an embodiment of an enterprise information system having an application server and a JMS provider.

FIG. 1 shows an embodiment of an enterprise information system 10 having multiple clusters. The system 10 may take many different forms, typically a mix of application servers upon which are running applications, message servers, databases, etc. The application servers may comprise individual servers, in that each resides on its own computing device having a processor such as 11, or may comprise server instances. A server, as that term is used here, is a computer or computer program that manages access to a centralized resource or service in a network. In this embodiment, the application servers manage and process messages within the EIS. They provide these services to applications. Applications are software programs that perform tasks such as electronic commerce, inventory, customer contact management, etc.

For example, if an application server instance such as 12 is involved in a transaction, such as a customer ordering an item from a web site, the application 14 could be the user interface through which the customer identifies the item to be purchased. The application 14 would then send a message to another application that manages inventory for a particular type of product to inquire as to whether the product is available. The application that handles the product may reside on the application server (app server) 12, or may reside on another application server within a cluster of application servers. Clustering allows multiple servers or server instances to act like a single system and provide high availability and faster processing of tasks.

Alternatively, the application that handles the product may reside on a different application server. The interaction between the different applications is typically handled by a messaging system, more particularly by instances of a JAVA™ Message Service (JMS). In the embodiments discussed here, the JMS provider 22 consists of a cluster of JMS servers such as 23 and 25. The application on the app server has no information related to the clustering of the JMS provider servers. The application server has residing upon it a resource adapter (RA) 18, also called a connector that interacts with the cluster.

Generally, the resource adapter deployed on an application server is specific to a particular JMS provider. Most applications that send messaging requests to the resource adapter do so in accordance with a standardized message format. Similarly, the resource adapter will typically be structured in accordance with the JAVA™ Connector Architecture (JCA). However, different JMS providers implement the JCA used on their side of the transaction differently, so typically the resource adapter used will be specific to a particular JMS provider. The applications have no visibility of this, but the application server will. One should note that the use of JCA with the RA is one embodiment of integrating messaging providers, and the embodiments discussed here apply even if the architecture does not employ JCA.

However, it is possible, using the embodiments described here, to deploy a resource adapter, such as RA 18 in FIG. 1, that is generic to the JMS providers and still allow the JMS provider to have unique features. As will be described here and in the related applications, the RA 18, the ITM 16 and the configuration file 13 may be provided as a 'bundle' to the application server provider. This allows the application server, regardless of the creating entity or application server vendor, to communicate with the JMS system, regardless of the JMS creating entity or vendor. The configuration file may be an XML file or other type of control file that allows the resource adapter to be reconfigured without having to recode, recompile and redeploy the resource adapter.

In addition to the generic properties of the adapter, the resource adapter also handles clustering operations for an implementation where the JMS message servers are clustered. The applications running on the application server have no visibility to the JMS provider, much less whether the JMS system consists of multiple clustered servers. The RA 18 and the ITM 16 handle the clustering operations for the applications such that the applications see only a single provider.

Figure 2:
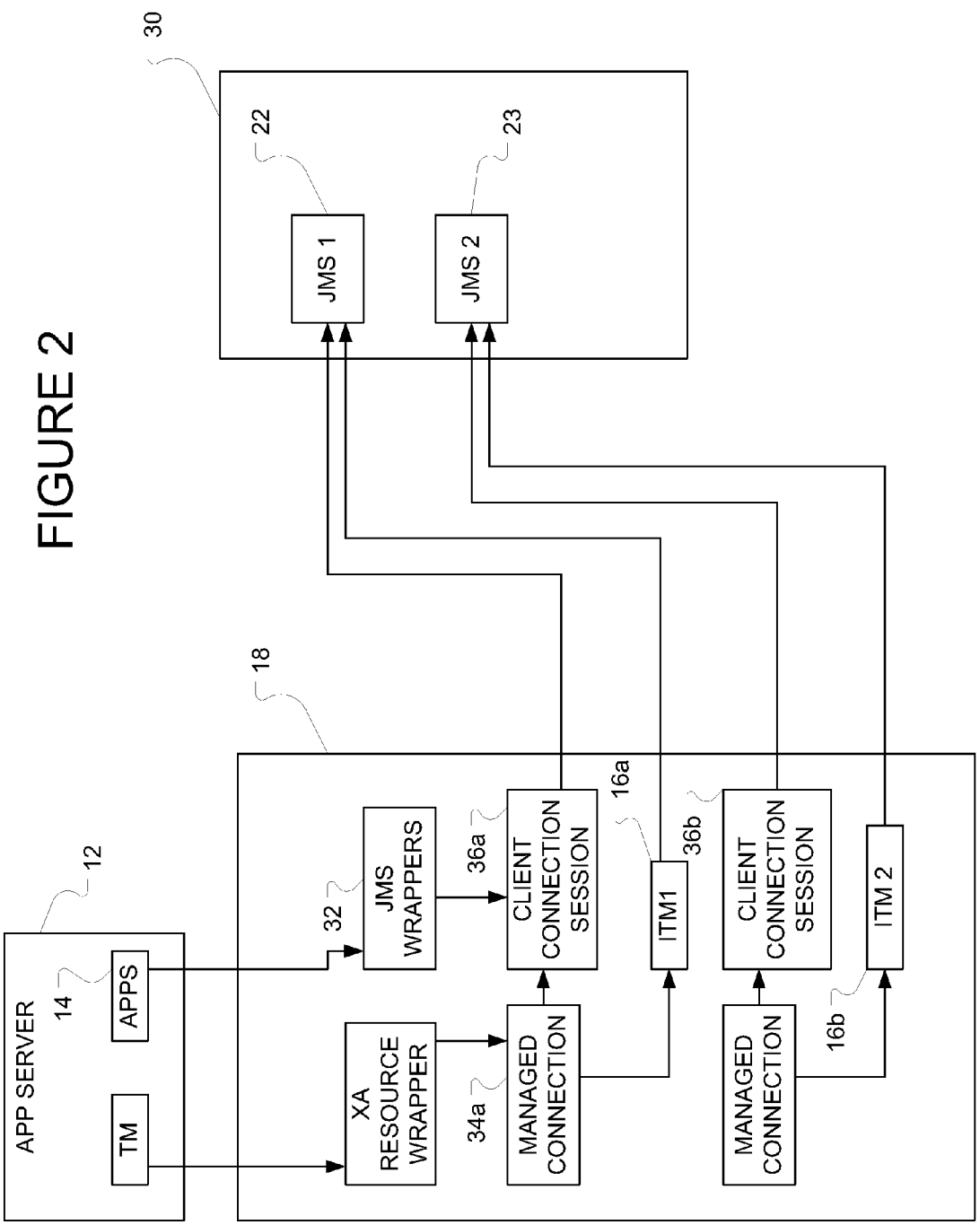
FIG. 2 shows an embodiment of a resource adapter used in relation to a JMS system and an application server.

FIG. 2 shows embodiments of the relationships between the application server 12, its transaction manager (TM) 38, the resource adapter 18, the ITM 16 and the JMS cluster 30, having JMS instances 1, 22 and JMS instance 2, 23, as well as possibly many others. The transaction manager 38 interacts with the transaction resource wrapper 30 provided in the resource adapter 18. The transaction (XA) resource adapter 30 relays transaction calls within messages from the applications to the ITM stubs 16a and 16b. The JMS system handles messages, but the contents of the messages may include transactional calls.

The resource adapter 18 uses the standard JMS application programming interface (API) and whatever the necessary extension is as determined by the configuration file 13 of FIG. 1 to interact with the cluster 30. The applications such as 14 on the apps server 12 interact with the resource adapter 18 and the JMS instances through the JMS wrappers 32. A 'wrapper' as used here means addition code that 'wraps' or encapsulates the call to allow the JMS provider to understand the call, as well as the ITM to manage the transactional information associated with the call or request. The ITM stubs will act to enlist and manage resources to do the work associated with the transaction and the resource adapter manages the connections such as 34a and 34b and the messaging across those connections as client connection sessions 36a and 36b.

When an application desires to send a message, also referred to as making a call, it accesses the connection factor using the resource adapter. The connection factory then establishes the connection between the source application and a destination. The resource adapter manages the connections and the messages in those connections. In a clustered implementation, the resource adapter handles the distribution of messages such that the source application is not aware of the clustering.

The resource adapter will handle clustering load balancing for outbound and inbound communications and will deal with connection management and distributed destinations for outbound communications and Message Drive Beans (MDBs) for inbound communications. First with regard to load balancing, when an outbound message is to be sent, such as from the application server 14 through the JMS 16, the JMS connection factory creates at least one connection and session associated with the message. Depending upon the messaging environment, synchronous or asynchronous, the JMS resource adapter will implement load balancing.

For synchronous communications, the JMS resource adapter will employ RMI (Remote Method Invocation) load balancing. The JMS connection factory creates the connections and sessions to point to different processing server instances with a predetermined load balancing algorithm or process. The JMS resource adapter considers both the JCA connection pooling, addressed in more detail further, and the ITM (Interposed Transaction Manager) affinity, in which the ITM and the JMS operations are located at the same instance. A second type of load balancing is distributed destination load balancing. A connection pointing to a processing application server can send messages to all members of a distributed destination.

The Interposed Transaction Manager typically exists between a transaction management system and a messaging provider. The application servers have no information about the messaging system other than one exists. The transaction managers manage messages with regard to a particular transaction and determine when a transaction has been completed. Transaction managers typically exist within an EIS system. However, transaction managers are typically vendor-specific and cannot handle clustering of transactions. An ITM sits between the transaction manager for a particular vendor and the message system to assist with cluster management and messaging. For purposes of the resource adapter, the ITM is generally preferred to have affinity with the JMS operations, meaning they are located at the same instance.

In addition to handling load balancing, the resource adapter needs to handle failovers. Any failures should be handled transparently to the requesting application server. If the failover occurs in an RMI object context, the resource adapter detects the connection failure, such as through a connection listener. It marks the connection and is corresponding managed connection in the JMS resource adapter as invalid. This results in them being destroyed and not given back to users. With the clustered JMS connection factory, this ensures that newly created JMS connections will point to live instances instead of dead instances.

Another type of failover handling is to migrate to a live processing application server instance. The JMS operations will be redistributed to the live processing application server instance and is distributed destination members. In this manner, the processing still proceeds, just with a different processing application server.

The above discussion has focused on outbound communications. Inbound communications, such as when the processing application servers return their responses to the JMS resource adapter 18, are handled somewhat differently. The resource adapter will make sure it is receiving messages from all distributed destination members and redirect the messages received to migrated or restarted destination members when migration or restarting happens. The resource adapter itself is programmed to deal with distributed topic members.

In addition to failovers, the resource adapter handles connection management and distributed destinations for outbound clustered communications and Message Drive Beans (MDBs) for inbound. Connection management relies upon the JCA connection pool. Each JMS resource adapter connection creation goes through the JCA connection pool. When populating the connection pool, the resource adapter and application server will create connections that are evenly distributed across processing application servers in the cluster. Internally, the JMS resource adapter has managed connection that hold JMS client connection and sessions that point to different application server instances. These are what are pooled. The resource adapter also associates an ITM with the managed connection to point to the same server instance as the managed connection to preserve affinity. The resource adapter will relay all transaction operations related to a particular managed connection to the associated ITM to achieve this affinity.

Figure 3:
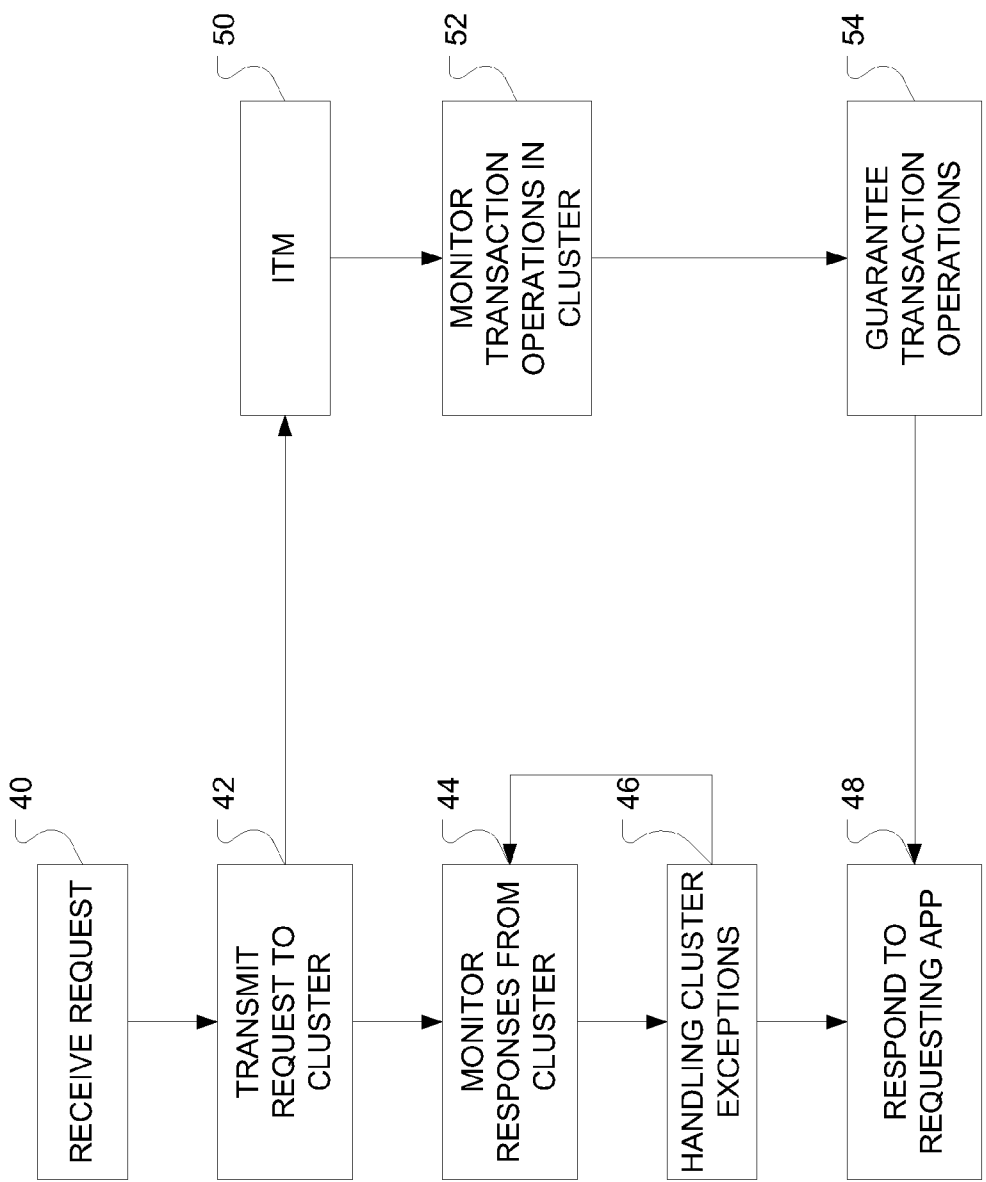
FIG. 3 shows an embodiment of a method to manage messaging and transactions in an enterprise information system.

When an application server fails in the outbound case, the JMS adapter will take appropriate action depending upon the transaction phase that is active when the failure occurred. This is shown in more detail in FIG. 3. As shown in FIG. 3, a request from a requesting application server is received by the resource adapter at 40. The request is to be transmitted to a cluster at 42, being the outbound case, and then listens for the response. At 44, the listener may determine that a failure has occurred. If the failure occurs when the outbound user is doing JMS operations, the exception may be sent to the outbound user at 46, in this case requesting application server. The requesting application server will then close the current connection/session and reopen another. If the failure occurs during the commit phase of the prepare-commit phases of operations, the transaction manager on the cluster will do a retry and drive the transaction to completion at 48. In either instance, the processing will eventually be completed at 60 and the requesting application is notified at 64.

For inbound communications, the resource adapter will uses multiple worker threads within a transaction thread to receive messages. Each worker thread will receive messages from a single member of the distributed destination. Each worker thread will also look up the ITM pointing to the same instance as is destination member, which will be used for all transaction calls from this worker thread. When a distributed destination member fails, the resource adapter will close the connection/session to that member and rebalance the worker threads across the cluster to receive messages from another live member.

Similarly, the ITM may handle the transaction related messages and tasks at 50. The ITM manages the transactional operations in the cluster at 52 and handles any exceptions. The exceptions may include one of the clustered message servers failing, requiring the portion of the transaction to migrate to another member of the cluster. It is important to note that the combination of resource adapter and interposed transaction manager interact with clustered message servers and still provide the transactional guarantees at 54. The semantics of a transactional guarantee are often referred to as ACID; atomicity, consistency, isolation and durability.

Having discussed the architecture and the operation of the system in general terms, it may be helpful to present an example use of the system. One should note that any examples given here are merely intended as examples and to aid in understanding of the embodiments. No limitation is intended or should be implied by any examples given here.

For example, one could imagine two divisions of a company each with their own application server clusters, such as the cluster of app servers shown in FIG. 1, having a need to communicate. One division may provide services and information for the other. They have mutually decided upon a request/response protocol for these communications.

The protocol they decided to follow has the following requirements. The request/response protocol may operate in an asynchronous fashion. This results from a lack of a predetermined amount of time for the processing of a request. In some cases, responses may be near instantaneous, but in other cases it could be quite lengthy. This may involve waiting for completion of batch jobs, waiting for humans to complete some action. If the protocol were synchronously implemented, threads in the requesting application server cluster would pose a problem. Threads in the requesting app server cluster would become indefinitely blocked, possibly resulting in all threads in that cluster becoming blocked.

Another requirement relates to the workload represented by each requests. The workloads represented by each request may vary widely. Load balancing, reactive to current load conditions, will alleviate some of this problem. Further requirements include durability, where neither requests nor responses should be lost or dropped, not even in a temporary power loss situation. No endless loops will exist. When the processing of a request fails, further attempts to process the request may be made. Such attempts should not continue forever and should at some point respond with an indication of failure as defined by the agreed upon request/response protocol. A final requirement is that the solution developed according to the above requirements must be app server portable.

In JAVAEE™, request/response patterns are typically implemented using Enterprise JAVA™ Beans (EJBs). These were specifically designed specifically for various occurrences of the above pattern. However, EJBs are fully synchronous and therefore fail to meet the above requirements. The company decides to use the following implementation.

Requests and responses will be implemented as JMS messages. Messages will be persistent and messaging operations will use distributed transactions (XA) to provide the required durability and atomicity. Requests and responses will be received/processed by Message Data Beans (MDBs). The MDBs will be configured to receive messages from all nodes in the JMS cluster. This provides the required reactive load-balancing. The MDBs with listener threads and MDB instances available will accept any requests available, increasing the load. MDBs that are already running at capacity, in which all threads and MDB instances are busy will not take on new requests and will instead leave them in the JMS cluster for other app server nodes to process.

MDBs processing requests will be coded to check JMSXDeliveryCount on received messages before doing any other processing in a given call to on Message. If the JMSXDeliveryCount is above a fixed threshold value, instead of trying to process the request, a response message indicating failure will be sent. This prevents endless loops while maintaining durability. The Resource Adapter and the clustered JMS provider will meet the load-balancing and app server portability requirements. The main elements of this system may include the JMS, the ITM, the RA, and the provider customizable code that customizes the RA for the JMS.

With a fully transparent clustering JMS implementation, in which a send operation to a JMS-cluster-wide queue via any JMS cluster node can be received via any other JMS cluster node without the receiver having to specify from which node to receive, there would be no need to the RA to perform any extra tasks for the above example. However, with some JMS systems, a logical destination may have as many physical members as there are JAVA™ Virtual Machines (JVM™s) running in the JMS cluster. Being able to receive a message from any and all of those physical destination messages requires explicitly specifying each of those physical destination members in receive operations. For example, the system can use multiple receive operations that explicitly specify every single node physical destination member rather than one receive operation with a cluster-wide logical destination. Another consideration is that when receiving messages from a given physical destination member, efficiency is improved if the connection used is to that same JMS cluster node. This is not required for the system to function correctly, but will increase efficiency.

In this example, the resource adapter provides relevant functionality. For example, the resource adapter provides a facility for the user to plug in a provider-customization implementation. In one embodiment, the RA provides two such mechanisms. A first mechanism has the JMS provider having its connection factories implement a public method named getOracleJMSRAProviderCustomization that returns the name of the class implementing the provider-customization. Secondly, the ProviderCustomization managed connection factory property may be set to the name of the class implementing the provider-customization.

In addition, the resource adapter provides support for an MDB to listen to a dynamic set of destinations rather than just a single destination. In one embodiment, the system uses this feature by the provider-customization class implementing is inboundDestinationSet ( ) method to return an instance of the provider.jms.ra.api.DestinationSet interface, wherein the term provider is whatever JMS provider is being used, such as Web Logic. The interface includes the following methods:

```
public Object createDestinationSet(Object context,
        String[ ]providerDestinationJNDILocations,
    Map jndiProperties,        DestinationSetListener listener,
                PrintWriterFactory printWriterFactory)
            throws ResourceException;
        public void closeDestinationSet(Object destinationSet,
            PrintWriterFactory printWriterFactory)
            throws ResourceException;
```

The Resource Adapter itself implements the DestinationSetListener interface, and during endpoint activation invokes the above createDestinationSet method to register itself with the provider-customization code. Using the providerDestinationJNDILocations and jndiProperties parameters the Resource Adapter takes the information it would normally have used to look up the JMS provider destination and passes it to the provider-customization code instead. In one embodiment of a JMS, that information corresponds to the JNDI location of the logical destination, which the JMS provider-customization code is able to use to obtain a complete set of destination members corresponding to the given logical destination. The provider-customization code then supplies those destinations to the Resource Adapter through the DestinationSetListener interface which contains the following methods:

```
public void add(Destination destination) throws DestinationAlreadyInSet;
public void remove(Destination destination) throws DestinationNotInSet;
```

The Resource Adapter also provides support for the creation of connections optimized for a given destination. To use this feature for both distributed transaction (XA) and non-XA MDBs, a provider-customization class should implement its inboundXAConnectionFactortyTakingDestination and inboundConnectionFactoryTakingDestination methods to return instances of the provider.jms.ra.api.XAConnectionFactoryTakingDestination and provider.jms.ra.api,ConnectionFactoryTakingDestination interfaces, respectively. The first interface includes methods for creating destination-optimized XA connections with or without credentials:

```
XAConnection createXAConnection(Object context,
        XAConnectionFactory xaConnectionFactory,
        Destination destination,
        PrintWriterFactory printWriterFactory) throws
        JMSException;
    XA Connection creatXAConnection(Object context,
        XAConnectionFactory xaConnectionFactory,
        Destination destination,
        PrintWriterFactory printWriterFactory) throws
JMSException;
```

In this embodiment, a second interface includes methods for creating destination-optimized (non-XA) connections with or without credentials:

```
Connection createConnection(Object context,
        ConnectionFactory ConnectionFactory,
        String userName,
        String password,
        Destination destination,
        PrintWriterFactory printWriterFactory) throws
    JMSException;
        Connection createConnection(Object context,
        ConnectionFactory ConnectionFactory,
        Destination destination,
        PrintWriterFactory printWriterFactory) throws
    JMSException;
```

When the Resource Adapter takes the destinations it receives via the DestinationSetListener interface and creates new listener threads to listen to them, the new listener threads invoke one of the above methods in order to obtain a destination-optimized connection which is then used for receiving messages from the given destination.

As discussed above, the JMS provider-customization provides the following functionality relevant to the above example. It provides the Resource Adapter with a dynamic set of physical destinations corresponding to the logical destination configured in the MDBs activation specification. Also as discussed above, the JMS provider-customization code provides destination-optimized connections. The discussion up to this point has focused on the resource adapter and the provider customization. In addition, interposed transaction manager (ITM) provides some other features.

In the above embodiment, the ITM leverages the JMS provider's transaction manager to provide a full XAResource implementation for the provider's JMS. Prior to the ITM, the provider's JMS typically only provided XA functionality when running on the provider's server, and could not provide JMS-specified XA-compliant behavior when the JMS client was run within other application servers. Further, the ITM provides a provider-generic XAResource implementation. This implementation associates and dissociates the transaction with the current thread, respectively. For all pairs of XAResource instances, the ITM insures that the instances satisfy the condition that the X.isSameRM is true. The ITM also ensures that the XAResource instances may be joined into a single XA transaction and prepared/committed/rolled back with a signal operation that maintains all ACID guarantees required by the JMS and XA specifications.

As discussed above, the embodiments above are merely provided as one specific example and no limitation to any of the examples above is intended or should be implied. In this manner, the resource adapter manages the cluster such that a requesting application server only sees a single instance of a processing application server. All messaging operations run through the resource adapter out to the processing applications servers across one or more clusters, transparently to the requesting application server. A unique aspect of this system is that there are no current implementations of a generic resource adapter to JMS operations that guarantees the transactional semantics.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A computer-controlled method of connecting a clustering messaging system, comprising:
   receiving, at a computer, requests from at least one requesting application on a requesting application server, wherein the requesting application server is associated with an application server provider;
   transmitting, by a resource adapter running on the computer, the requests to multiple processing message servers operating as a cluster as an outbound communication, wherein clustering operations of the processing message servers is transparent to the requesting application and the transmitting occurs independent of the application server provider, wherein the resource adapter is generic to service provider while allowing unique features of each service provider to be retained;
   monitoring, by the resource adapter, responses from the cluster of processing message servers to determine if processing of the requests are completed;
   handling, by the resource adapter, any exceptions in processing across the cluster transparently to the requesting application running on the requesting application server, such that processing of the requests are completed;
   maintaining guarantees of transactional semantics related to any transactions associated with requests, by the resource adapter; and
   responding, by the resource adapter, to the requesting application server when processing of the request has completed.

2. The computer-controlled method of claim 1, further comprising receiving multiple requests from multiple requesting application servers.

3. The computer-controlled method of claim 2, further comprising load balancing the multiple requests across the cluster of processing message servers.

4. The computer-controlled method of claim 3, wherein load balancing comprises creating connections and sessions to point to different processing message servers using a predefined load balancing process.

5. The computer-controlled method of claim 3, wherein load balancing comprises distributed destination load balancing using a connection pointing to all members of a distributed destination.

6. The computer-controlled method of claim 1, wherein handling any exceptions comprises:
   identifying a failed processing message server;
   if identifying the failed processing message server occurs during outgoing messaging, notifying the requesting application on the requesting processing message server of the failover; and
   if identifying the failed processing message server occurs after outgoing messaging, one of either restarting the failed processing message server or migration of the request to a different processing message server occurs.

7. The computer-controlled method of claim 1, wherein using a resource adapter comprises:
   receiving messages from the processing message servers as Message Driven Beans (MDB) destinations; and
   distributing the messages to MDBs.

8. The computer-controlled method of claim 7, wherein distributing the messages to MDBs comprises:
   spawning multiple worker threads, each thread corresponding to one endpoint and one messaging session; and
   monitoring the multiple worker threads until completion.

9. The computer-controlled method of claim 1, wherein guaranteeing the transaction semantics is handled by an interposed transaction manager.

10. A system, comprising:
    at least one requesting application residing upon a requesting application server, the requesting application server being associated with an application server provider;
    multiple processing message servers operating as a cluster, wherein the message servers are independent of the application server provider;
    a resource adapter in the form of executable code being executed by a processor on a first computer, the resource adapter being generic to service providers while maintaining unique features of the service providers, the resource adapter to:
    receive a request from the requesting application;
    transmit the request to the cluster of processing message servers, independent of the application server provider;
    monitor processing of the request on the cluster of processing message servers transparently to the requesting application;
    handling any exception in the processing of the request transparently to the requesting application; and
    responding to the requesting application when the processing is complete; and
    an interposed transaction manager in the form of executable code being executed by a processor, the interposed transaction manager to:
    receive transactional operations associated with the requests; and
    providing transaction guarantees related to the transactional operations.

11. The system of claim 10, wherein the requesting application, at least one of the processing message servers and the resource adapter reside on the first computer.

12. The system of claim 10, wherein at least one of the processing message servers and the resource adapter reside on the first computer.

13. The system of claim 10, wherein the resource adapter and at least one of the processing message servers reside on the first computer.

14. The system of claim 10, wherein the cluster of processing message servers reside on a same computer.

15. The system of claim 10, wherein at least some of the processing message servers within the cluster reside on a different computer than others of the processing message servers.

* * * * *